(12) United States Patent
Mochizuki (10) Patent No.: US 12,065,086 B2
(45) Date of Patent: Aug. 20, 2024

(54) WIRE HARNESS

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Taiji Mochizuki, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 264 days.

(21) Appl. No.: 17/625,762

(22) PCT Filed: Jun. 29, 2020

(86) PCT No.: PCT/JP2020/025438
§ 371 (c)(1),
(2) Date: Jan. 9, 2022

(87) PCT Pub. No.: WO2021/010145
PCT Pub. Date: Jan. 21, 2021

(65) Prior Publication Data
US 2022/0274544 A1    Sep. 1, 2022

(30) Foreign Application Priority Data
Jul. 16, 2019 (JP) .................................. 2019-130969

(51) Int. Cl.
*B60R 16/02* (2006.01)

(52) U.S. Cl.
CPC ................................ *B60R 16/0215* (2013.01)

(58) Field of Classification Search
CPC ................................................... B60R 16/0215
(Continued)

(56) References Cited

U.S. PATENT DOCUMENTS 2,299,140 A * 10/1942 Hanson .............. H01B 7/0045
174/72 A
7,854,989 B2   12/2010 Yabe et al.
(Continued)

FOREIGN PATENT DOCUMENTS

JP   2000-261932 A   9/2000
JP   2015-005352 A   1/2015

OTHER PUBLICATIONS

International Search Report issued on Sep. 15, 2020 for WO 2021/010145 A1 (4 pages).

*Primary Examiner* — Timothy J Thompson
*Assistant Examiner* — Michael F Mcallister
(74) *Attorney, Agent, or Firm* — Venjuris, P.C.

(57) ABSTRACT

It is an object of the present invention to provide a technology with which a protective portion with high protective capabilities is provided while avoiding an operation to switch out binding adhesive tape much as possible. A wire harness includes: a wire; and a tape-wrapping protective portion provided in at least a partial region along a longitudinal direction of the wire, the tape-wrapping protective portion having a portion wrapped with adhesive tape to form a gap in the surrounding region of the wire.

6 Claims, 4 Drawing Sheets

(58) Field of Classification Search
USPC .......................................................... 174/72 A
See application file for complete search history.

(56) References Cited

U.S. PATENT DOCUMENTS

| | | | |
|---|---|---|---|
| 2003/0217864 A1* | 11/2003 | Ishikawa .............. | H01B 7/0045 |
| | | | 174/135 |
| 2011/0067920 A1* | 3/2011 | Toyama .................. | H02G 3/32 |
| | | | 174/72 A |
| 2013/0118799 A1* | 5/2013 | Watanabe ............ | H02G 3/0481 |
| | | | 174/72 A |
| 2013/0273333 A1* | 10/2013 | Meier ........................ | C09J 7/21 |
| | | | 428/377 |
| 2016/0064120 A1* | 3/2016 | Wakabayashi ....... | H01B 7/0045 |
| | | | 174/72 A |
| 2016/0248236 A1* | 8/2016 | Kaneko ................ | H02G 3/0487 |
| 2016/0260522 A1 | 9/2016 | Yamamoto | |
| 2017/0025201 A1* | 1/2017 | Wakabayashi ....... | H01B 7/0045 |

* cited by examiner

WIRE HARNESS

CROSS REFERENCE TO RELATED APPLICATIONS

This application is a national phase of PCT application No. PCT/JP2020/025438, filed on 29 Jun. 2020, which claims priority from Japanese patent application No. 2019-130969, filed on 16 Jul. 2019, all of which are incorporated herein by reference.

TECHNICAL FIELD

The present disclosure relates to a wire harness.

BACKGROUND

In a wire harness, a protective member different from adhesive tape is provided at a portion where high protective capabilities are required. Examples of such a protective member include a sheet disclosed in Patent Document 1 and a corrugated tube disclosed in Patent Document 2, for example.

PRIOR ART DOCUMENT

Patent Document

Patent Document 1: JP 2007-128797A
Patent Document 2: JP 2000-261932A

SUMMARY OF THE INVENTION

Problems to be Solved

When a protective member different from adhesive tape is attached to a wire harness, an operation for switching the binding adhesive tape with a protective member needs to be performed.

Thus, it is an object of the present disclosure to provide a technology with which a protective portion with high protective capabilities is provided while avoiding an operation to switch out binding adhesive tape as much as possible.

Means to Solve the Problem

A wire harness according to the present disclosure includes: a wire; and a tape-wrapping protective portion provided in at least a partial region along a longitudinal direction of the wire, wherein the tape-wrapping protective portion has a portion wrapped with adhesive tape to form a gap in the surrounding region of the wire.

Effect of the Invention

With the present disclosure, a protective portion with high protective capabilities is provided while tending to avoid an operation to switch out binding adhesive tape as much as possible.

DETAILED DESCRIPTION TO EXECUTE THE INVENTION

Description of Embodiments of the Present Disclosure

First, embodiments of the present disclosure will be listed and described.

The wire harness of the present disclosure is as follows.

(1) A wire harness including: a wire; and a tape-wrapping protective portion provided in at least a partial region along a longitudinal direction of the wire, wherein the tape-wrapping protective portion has a portion wrapped with adhesive tape to form a gap in the surrounding region of the wire. The outer diameter of the tape-wrapping protective portion increases by an amount corresponding to the gap between the wire and the tape, and an edge is unlikely to reach the wire. The tape-wrapping protective portion can be formed using adhesive tape. Accordingly, a protective portion with high protective capabilities is provided while avoiding an operation to switch out binding adhesive tape much as possible.

(2) The tape-wrapping protective portion may include a first tape-wrapping protective portion, the first tape-wrapping protective portion may have an end portion wrapping portion and an overlap wrapping portion, adhesive tape may be wrapped at the same position to form a plurality of layers in the end portion wrapping portion, a partial region along a width direction of adhesive tape may be wrapped in a spiral shape so as to be sequentially overlapped in the overlap wrapping portion, a wrap-start portion of the overlap wrapping portion may overlap the outer circumferential side of the end portion wrapping portion, and an intermediate portion of the overlap wrapping portion may be provided with the gap. Thus, it is easy to form a gap.

(3) On an end-wrap portion side of the overlap wrapping portion, the adhesive tape may be adhered to the wire at intervals in a circumferential direction of the wire. Thus, a gap can be formed over the largest area possible along the circumferential direction of the wire. Also, the outer surface of the overlap wrapping portion is unlikely to be depressed toward the inner surface even when pressed.

(4) The tape-wrapping protective portion may include a second tape-wrapping protective portion in which adhesive tape is wrapped to form a plurality of layers, and each layer of the second tape-wrapping protective portion may be wrapped so as to form a gap in regions different from each other in a circumferential direction.

Accordingly, a gap can be formed over the largest area possible along the circumferential direction of the wire.

DETAILS OF EMBODIMENTS OF THE PRESENT DISCLOSURE

Specific examples of a wire harness of the present disclosure will be described below with reference to the drawings. Note that the present disclosure is not limited to these illustrative examples, but is indicated by the claims, and all changes that come within the meaning and range of equivalency of the claims are intended to be embraced therein.

Embodiment 1

Figure 1:
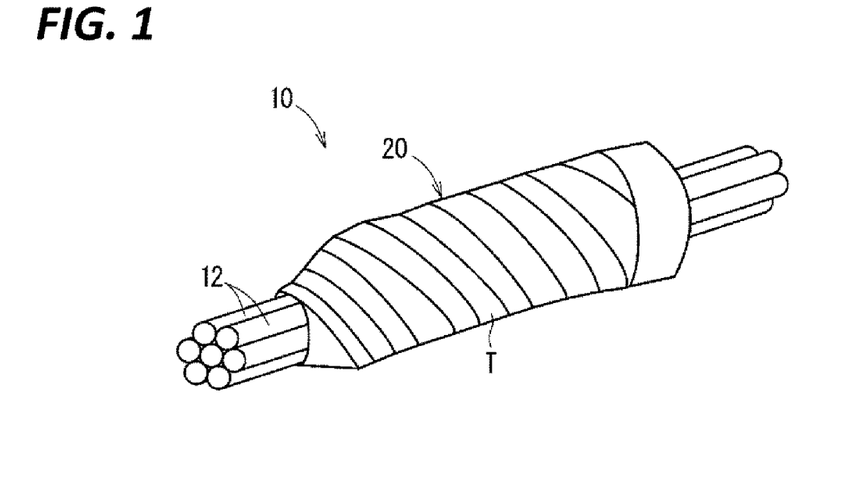
FIG. 1 is a perspective view showing a wire harness according to Embodiment 1.
Figure 2:
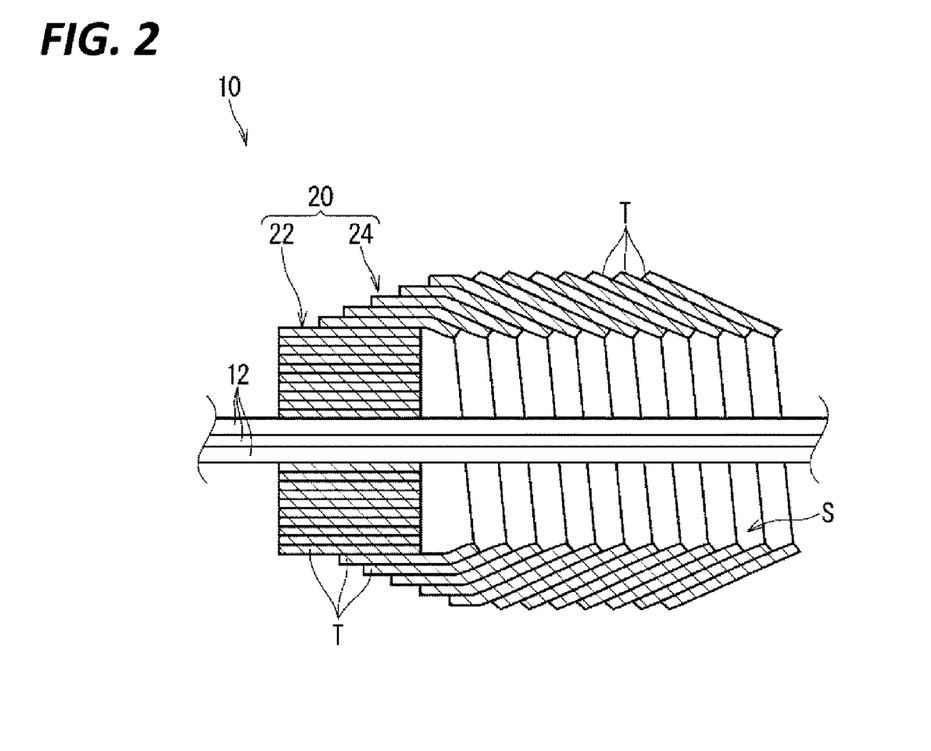
FIG. 2 is a vertical cross-sectional diagram showing the wire harness according to Embodiment 1.
Figure 3:
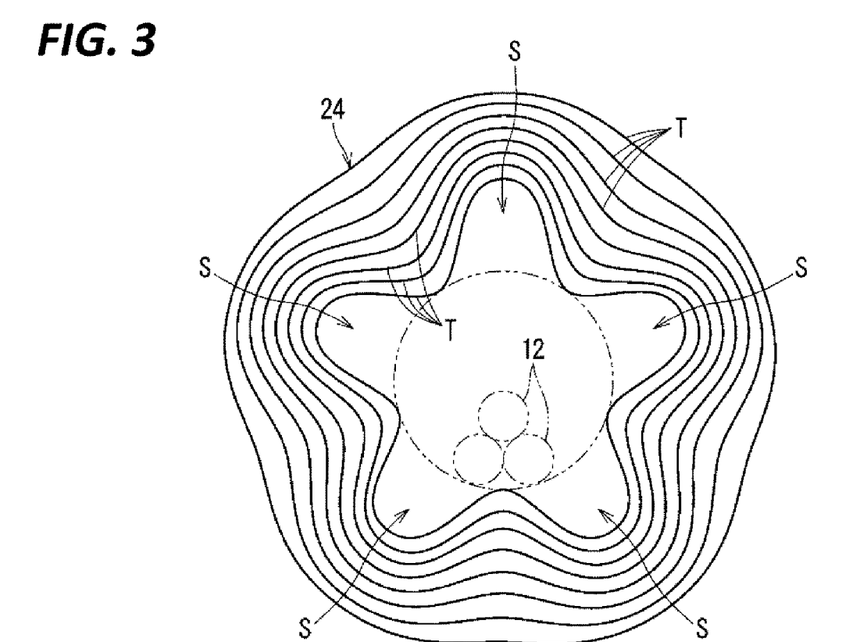
FIG. 3 is a descriptive diagram showing a first tape-wrapping protective portion as viewed from a wrap-end portion side.

A wire harness according to Embodiment 1 is described below. FIG. 1 is a perspective view showing a wire harness 10 according to Embodiment 1. FIG. 2 is a vertical cross-sectional diagram showing the wire harness 10 according to Embodiment 1. FIG. 3 is a descriptive diagram showing a first tape-wrapping protective portion 20 as viewed from a wrap-end portion side.

The wire harness 10 is a wiring member for electrically connecting electrical components installed in a vehicle. The wire harness 10 includes a wire 12 and a tape-wrapping protective portion 20.

The wire 12 is a coated wire in which an insulating coating is formed around a core wire. The core wire is made of copper, aluminum, a copper alloy, or an aluminum alloy. The core wire may be made of a single wire member, or may be a stranded wire in which a plurality of wire strands are twisted together. The insulating coating is made of a resin such as PVC, polyethylene, and fluorocarbon resin. This wire 12 has the function of transmitting electric signals, electric power, or the like.

It is sufficient that the wire harness 10 has at least one wire 12. Here, the wire harness 10 is provided with a plurality of wires 12. The wires 12 may all have the same outer diameter, or include wires 12 with different outer diameters. A connector may be provided at an end portion of the wires 12.

Each connector is a resin housing that houses an end portion of a wire 12. For example, a terminal is connected to an end portion of a wire 12. This terminal is housed and held in a cavity formed in the housing. When the connector is connected to a partner connecter, the terminal in the connector is connected to a terminal in the partner connecter.

A plurality of wires 12 are branched at intermediate positions of the wire harness 10, and end portions thereof are respectively housed in a predetermined connector housing. Accordingly, the wire harness 10 is formed in a shape that corresponds to the wiring form of the wires 12 in the vehicle.

The tape-wrapping protective portion 20 is provided in at least a partial region along the longitudinal direction of the wires 12. The tape-wrapping protective portion 20 is formed by wrapping adhesive tape T around the wires 12.

Here, the wrapping method with which a single continuous piece of adhesive tape T is wrapped around the wires 12 will be described.

How a continuous piece of adhesive tape T is wrapped around the wires 12 is largely classified into a wrapping method where the adhesive tape T is wrapped while the adhering region thereof is shifted along the longitudinal direction of the wires 12, and a wrapping method where the adhesive tape T is wrapped without the adhering region thereof being shifted along the longitudinal direction of the wires 12. In the case of the former, the adhesive tape T wrapped around the wires 12 is passed around the wires 12 while shifting position along the longitudinal direction of the wires 12, in the shape of a spiral. In the case of the latter, the adhesive tape T wrapped around the wires 12 is passed around the wires 12 at a fixed position along the longitudinal direction of the wires 12, in the shape of a coil. Below, in the present specification, the former wrapping method is referred to as spiral wrapping, and the latter wrapping method is referred to as fixed-position wrapping.

Furthermore, the spiral wrapping is largely classified into a wrapping method where a portion in the width direction of the adhesive tape T is overlapped when the adhesive tape T makes more than one lap around the wires 12, and a wrapping method where the adhesive tape T is not overlapped in the width direction when the adhesive tape T makes more than one lap around the wires 12. In the case of the former, properties such as protection and water-proofing are improved because there are no gaps in the adhesive tape T along the longitudinal direction of the wires 12. Also, the thickness of a portion where the adhesive tape T is wrapped is increased by an amount corresponding to the portion where parts of the adhesive tape T overlap. In the case of the latter, a large area can be wrapped while suppressing the amount of adhesive tape T used. Also, the thickness of the portion where the adhesive tape T is wrapped is reduced by an amount that corresponds to the absence of overlapping adhesive tape T. Below, in the present specification, the former wrapping method is referred to as overlap wrapping, and the latter wrapping method is referred to as non-lap wrapping.

Regarding overlap wrapping, the ratio of the overlapping width of the following wrapped portion to the full width of the previously wrapped portion is referred to as a lap margin. For example, overlap wrapping includes half-lap wrapping where half the width of the adhesive tape T is overlapped, and the like. The lap margin in half-lap wrapping is ½.

The relation between the lap margin and the layers of adhesive tape T in an intermediate region of the overlap wrapping portion 24 is generalized as follows. That is, n is an integer of 2 or more. When the lap margin is (n−1) of n, the adhesive tape T has n layers in all portions of the intermediate region. When the lap margin is greater than (n−1) of n and smaller than (n+1) of n, the adhesive tape T extends in a spiral shape where an n layer portion and an (n+1) layer portion are adjacent to each other in the intermediate region. Accordingly, when the lap margin is greater than (n−1) of n, the adhesive tape T will have more than n layers in at least a portion of the intermediate region.

Non-lap wrapping includes rough wrapping where gaps are formed between laps of the adhesive tape T in the longitudinal direction of the wires 12. Note that, in view of overlapping of the adhesive tape T, the non-lap wrapping is a wrapping method where the lap margin is zero. Also, the above fixed-position wrapping is a wrapping method where the entire width of the adhesive tape T is overlapped and the lap margin is one. Thus, the fixed-position wrapping may also be referred to as all-lap wrapping.

The portion of the adhesive tape T wrapped using an aforementioned wrapping method can be treated as a wrapping portion that corresponds to the wrapping method thereof. For example, a portion wrapped using spiral wrapping can be considered a spiral-wrapping portion. Also, for example, a portion wrapped using fixed-position wrapping can be considered a fixed-position wrapping portion.

Note that, when a continuous piece of adhesive tape T is wrapped around the wires 12, it goes without saying that the above-described wrapping methods can be combined as appropriate.

The tape-wrapping protective portion 20 has a portion where the adhesive tape T is wrapped so as to form gaps (spaces) S around the wires 12. The gaps S are formed between the outer surface of the wires 12 and the inner surface of the tape-wrapping protective portion 20.

Here, protrusions and recessions extending along a radial direction can be lined up in a circumferential direction on the outer surface of a wire bundle in which the wires 12 are bundled. If the adhesive tape T is wrapped around the wire bundle, gaps can be formed by these protrusions and recessions. However, in the present specification, the gaps S that can be formed in the tape-wrapping protective portion 20 are different from gaps formed by the protrusions and recessions of the above wire bundle. The gaps S formed in the tape-wrapping protective portion 20 are not gaps formed corresponding to the protrusions and recessions formed in the external shape of an adherend wrapped in the adhesive tape T. For example, the gaps S that can be formed in the tape-wrapping protective portion 20 are formed by, in at least a portion of the laps around the wires 12, winding the adhesive tape T so that the lap length thereof is longer than the lap length of the inner portion thereof. Here, when there are protrusions and recessions in the inner portion, the lap length of the inner portion refers to a lap length when the adhesive tape T is wound, under tension, into a shape that corresponds to the protrusions.

The present example is an example where the tape-wrapping protective portion 20 is a first tape-wrapping protective portion 20. The first tape-wrapping protective portion 20 has an end portion wrapping portion 22 and an overlap wrapping portion 24. The gaps S are formed in the intermediate portion of the overlap wrapping portion 24.

The end portion wrapping portion 22 is provided at one end portion of the first tape-wrapping protective portion 20 in the longitudinal direction of the wires 12. In the end portion wrapping portion 22, the adhesive tape T is wrapped at the same position to form layers. Accordingly, the end portion wrapping portion 22 is a fixed-position wrapping portion.

The wrap-start portion of the overlap wrapping portion 24 overlaps the outer circumferential side of the end portion wrapping portion 22. The wrap-start portion of the overlap wrapping portion 24 starts on the one end portion side of the first tape-wrapping protective portion 20 relative to the center in the width direction of the end portion wrapping portion 22. Here, the wrap-start portion of the overlap wrapping portion 24 starts from the wrap-end portion of the end portion wrapping portion 22. That is, even at the portion of the overlap wrapping portion 24 that overlaps the end portion wrapping portion 22, the adhesive tape T is wrapped with the same lap margin as the portion of the overlap wrapping portion 24 that does not overlap the end portion wrapping portion 22.

The overlap wrapping portion 24 is gradually wrapped from the portion where it overlaps the end portion wrapping portion 22 to the portion where it does not overlap the end portion wrapping portion 22. At this time, in the overlap wrapping portion 24, the amount with which the adhesive tape T overlaps the end portion wrapping portion 22 is gradually reduced while the adhesive tape T is wrapped, and eventually ceases to overlap the end portion wrapping portion 22 at all. Below, a portion of the overlap wrapping portion 24 starting from the wrap-start portion to a portion where at least a portion of the adhesive tape T overlaps the end portion wrapping portion 22 is referred to as a first portion. Accordingly, the first portion includes a portion that protrudes from the end portion wrapping portion 22. The portion of the first portion protruding from the end portion wrapping portion 22 is referred to as a protruding portion. In the overlap wrapping portion 24, the portion extending from the position where the entirety of the adhesive tape T ceases to overlap the end portion wrapping portion 22, that is, the portion where the adhesive tape T is wrapped from the end of the first portion toward the other end side, is referred to as the second portion. Also, in the overlap wrapping portion 24, the portion that does not overlap the end portion wrapping portion 22 is referred to as a raised portion. The raised portion is constituted by the protruding portion of the first portion and the second portion.

In the first portion, a portion of the adhesive tape T overlaps the end portion wrapping portion 22. The protruding portion is supported by the end portion wrapping portion 22. The end portion wrapping portion 22 functions as a support member that supports the protruding portion. Accordingly, in the first portion, the protruding portion is likely to be kept in a state where it is raised away from the wires 12. Similarly, the second portion is raised away from the wires 12 due to the protruding portion functioning as a support member. Accordingly, the raised portion is wrapped raised away from the wires 12 across the gaps S, and the gaps S of the tape-wrapping protective portion 20 are formed in the raised portion.

On the end-wrap portion side of the overlap wrapping portion 24, the adhesive tape T is adhered to the wires 12 at intervals in the circumferential direction of the wires 12, as shown in FIG. 3. In the first tape-wrapping protective portion 20, the overlap wrapping portion 24 continues as is to the wrap-end portion thereof. Here, when the raised portion becomes longer, the thus wrapped portion will be unable to support the raised portion, and a portion of the raised portion will collapse inwardly, and adhere to the wires 12. For example, if the adhesive tape T is wrapped to form the raised portion, eventually the wrapping pressure of the adhesive tape T will exceed the force supporting the raised portion. In this case, a portion of the raised portion adheres to the wires 12. When a portion of the raised portion adheres to the wires 12, the force supporting the raised portion is temporarily increased, and the adhesive tape T is wrapped with the raised portion once again supported raised away from the wires 12. By repeating this, on the end-wrap portion side of the overlap wrapping portion 24, the adhesive tape T is adhered to the wires 12 at a plurality of positions at intervals in the circumferential direction of the wires 12.

The adhesive tape T of the end portion wrapping portion 22 and the adhesive tape T of the overlap wrapping portion 24 may be separated. That is, the adhesive tape T may be cut once the end portion wrapping portion 22 has been fully wrapped, and wrapping of the overlap wrapping portion 24 may be started anew. In this case, there is no need to provide a bridging portion between the end portion wrapping portion 22 and the overlap wrapping portion 24.

The adhesive tape T of the end portion wrapping portion 22 and the adhesive tape T of the overlap wrapping portion 24 may also be one continuous piece. In this case, there is no need to cut the adhesive tape T once the end portion wrapping portion 22 has been fully wrapped. In the case where the adhesive tape T of the end portion wrapping portion 22 and the adhesive tape T of the overlap wrapping portion 24 is one continuous piece, it is preferable that the number of laps made at the bridging portion between the wrap-end portion of the end portion wrapping portion 22 and the wrap-start portion of the overlap wrapping portion 24 is as small as possible, and may be smaller than one lap, and may be smaller than a half lap, for example.

The number of laps made at the end portion wrapping portion 22 is not particularly limited, provided there are two or more laps, and can be set as appropriate. For example, the number of laps made at the end portion wrapping portion 22 may be three or more, five or more, and ten or more. The number of laps made at the end portion wrapping portion 22 may be set in view of the thickness of the adhesive tape T and the finishing thickness of the fixed-position wrapping portion 22, for example. Specifically, if the thickness of the adhesive tape T is 0.1 mm and the finishing thickness of the end portion wrapping portion 22 is to be 2.0 mm, the number of laps made at the end portion wrapping portion 22 can be set to 20.

The lap margin of the overlap wrapping portion 24 may be set in view of the thickness of the adhesive tape T and the finishing thickness (thickness from the inner surface on the wires 12 side to the outer surface) of the overlap wrapping portion 24, for example. Specifically, if the thickness of the adhesive tape T is 0.1 mm and the finishing thickness of the overlap wrapping portion 24 is to be 1.0 mm, by employing a $9/10$ lap margin, the required finishing thickness of the overlap wrapping portion 24 can be obtained.

Also, the lap margin of the overlap wrapping portion 24 may be set in view of the rigidity of the adhesive tape T. That is, if the lap margin is the same in a case where the adhesive tape T has high rigidity and a case where it has low rigidity, if the adhesive tape T has high rigidity, the supporting force of the second portion in the raised portion increases, and the raised portion is likely to be kept in a raised state. On the other hand, if the adhesive tape T has low rigidity, the supporting force of the second portion in the raised portion decreases, and the raised portion is unlikely to be kept in a raised state. If the lap margin is increased, the supporting force of the second portion in the raised portion is increased by a corresponding amount, and the raised portion is likely to be kept in a raised state.

The width of the protruding portion when the overlap wrapping portion 24 has made one full lap is smaller than the finishing thickness of the end portion wrapping portion 22. Thus, the protruding portion of the first lap of the overlap wrapping portion 24 is not adhered to the wires 12. Accordingly, the raised portion formed from the second lap onward of the overlap wrapping portion 24 is likely to be raised away from the wires 12. For example, adhesive tape T with a thickness of 0.1 mm and a width of 19 mm is used, and the number of laps of the end portion wrapping portion 22 is set to 20 and the lap margin of the overlap wrapping portion 24 is set to $9/10$, as described above. The width of the protruding portion once the overlap wrapping portion 24 has made one full lap will be 1.9 mm, which is $1/10$ of the width of the adhesive tape T. This width is smaller than 2.0 mm, which is the finishing thickness of the end portion wrapping portion 22.

Effects Etc. Of Embodiment 1

With the wire harness 10 configured as described above, the outer diameter of the tape-wrapping protective portion 20 increases by an amount corresponding to the gaps S around the wires 12, and an edge is unlikely to reach the wires 12. The tape-wrapping protective portion 20 can be formed using adhesive tape T. Thus, a protective portion with high protective capabilities is provided while avoiding an operation to switch out binding adhesive tape T. A first tape-wrapping protective portion 20 is provided as the tape-wrapping protective portion 20. Accordingly, the gaps S can be easily formed.

On the wrap-end portion side of the overlap wrapping 24, the adhesive tape T is adhered to the wires 12 at intervals in the circumferential direction of the wires 12, and thus the gaps S can be formed over the largest area possible along the circumferential direction of the wires 12. That is, the gaps S are dispersed along the circumferential direction of the wires 12. Also, the outer surface of the overlap wrapping portion 24 is unlikely to be depressed toward the inner surface even when pressed.

Embodiment 2

Figure 4:
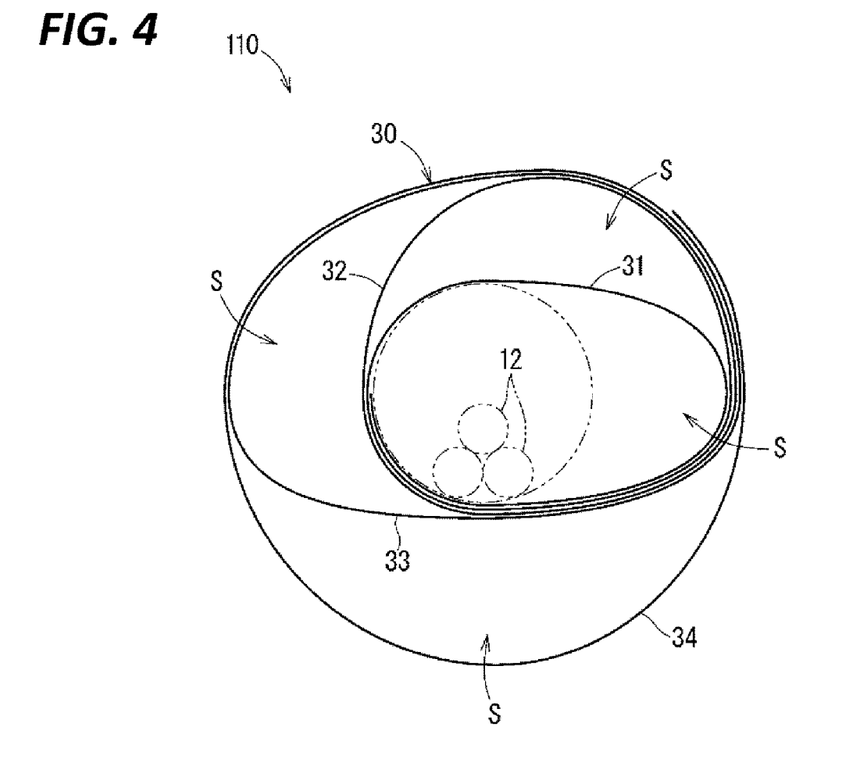
FIG. 4 is front view showing a wire harness according to Embodiment 2.

A wire harness according to Embodiment 2 will be described. FIG. 4 is a front view showing a wire harness 110 according to Embodiment 2. Note that, in the description of the present embodiment, constitutional elements similar to those described above are given the same reference numerals and description thereof is omitted.

The present example is an example where the tape-wrapping protective portion is a second tape-wrapping protective portion 30. Adhesive tape T is wrapped in layers in the second tape-wrapping protective portion 30. Each layer of the second tape-wrapping protective portion 30 is wrapped so as to form a gap S in regions different from each other in the circumferential direction.

The second tape-wrapping protective portion 30 will be described below with reference to the manufacturing method of the second tape-wrapping protective portion 30 shown in FIGS. 5 to 8.

Figure 5:
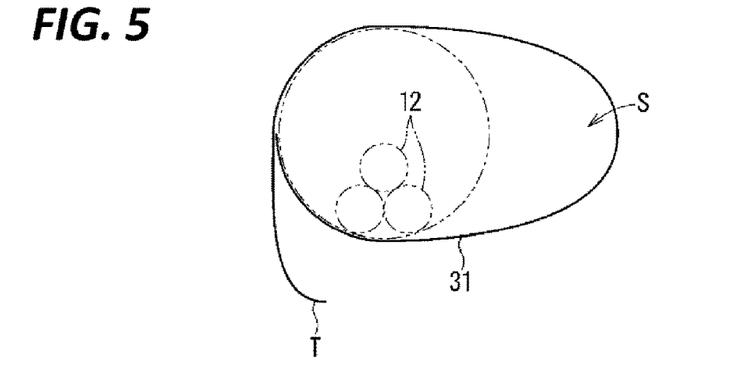
FIG. 5 is a descriptive diagram showing a first layer of a second tape-wrapping protective portion being wrapped.

FIG. 5 is a descriptive diagram showing a first layer 31 of the second tape-wrapping protective portion 30 being wrapped. The adhesive tape T of the first layer 31 is adhered to another region of the adherend (wires 12) on the inner side thereof while leaving a gap S in a region on the right side of the sheet relative to the adherend (wires 12) on the inner side thereof.

Figure 6:
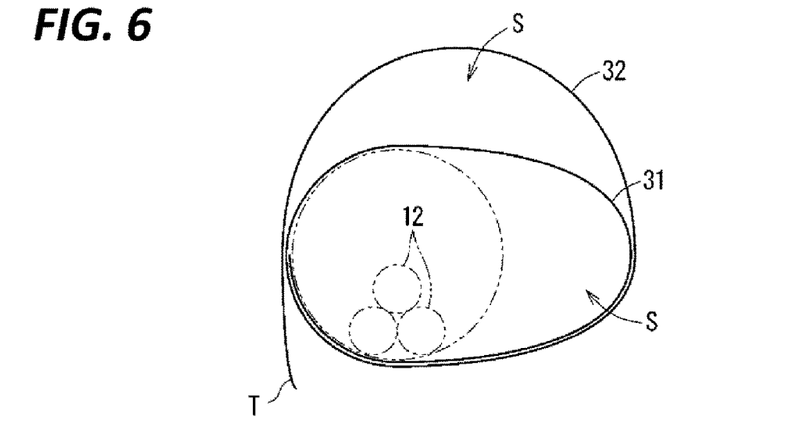
FIG. 6 is a descriptive diagram showing a second layer of the second tape-wrapping protective portion being wrapped.

FIG. 6 is a descriptive diagram showing a second layer 32 of the second tape-wrapping protective portion 30 being wrapped. The adhesive tape T of the second layer 32 is adhered to another region of the adherend on the inner side thereof (adhesive tape T of first layer 31) while leaving a gap S in a region on the upper side of the sheet relative to the adherend on the inner side thereof (adhesive tape T of first layer 31).

Figure 7:
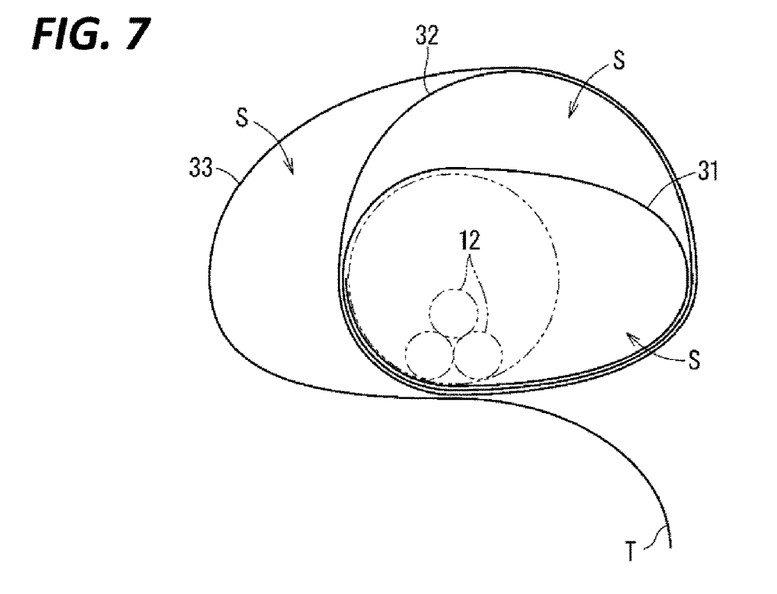
FIG. 7 is a descriptive diagram showing a third layer of the second tape-wrapping protective portion being wrapped.

FIG. 7 is a descriptive diagram showing a third layer 33 of the second tape-wrapping protective portion 30 being wrapped. The adhesive tape T of the third layer 33 is adhered to another region of the adherend (adhesive tape T of second layer 32) on the inner side thereof while leaving a gap S in a region on the left side of the sheet relative to the adherend (adhesive tape T of second layer 32) on the inner side thereof.

Figure 8:
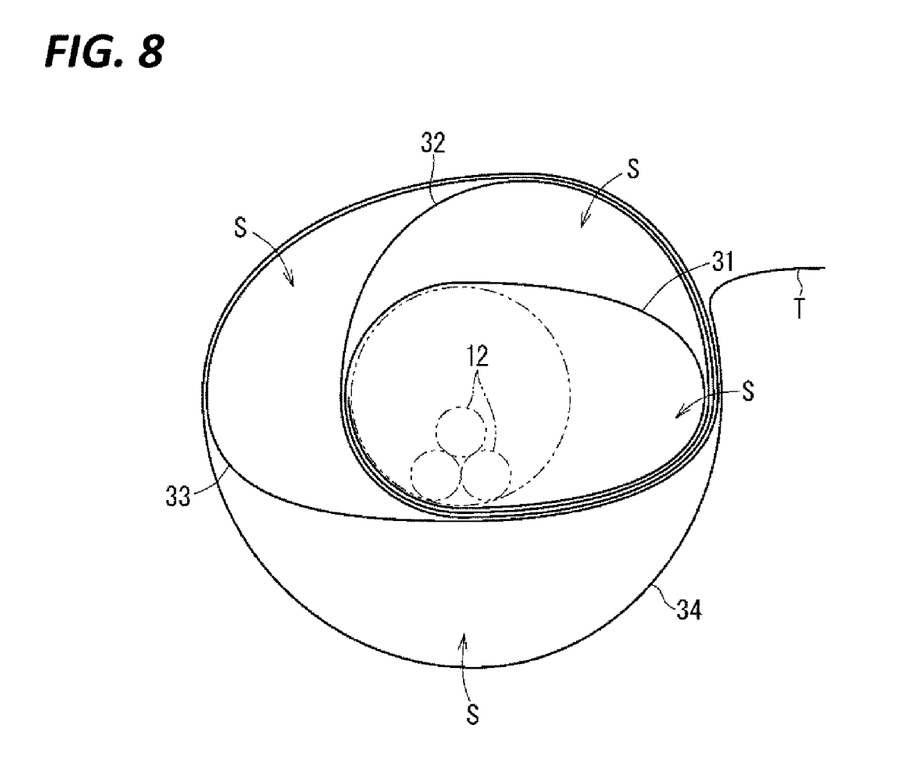
FIG. 8 is a descriptive diagram showing a fourth layer of the second tape-wrapping protective portion being wrapped.

FIG. 8 is a descriptive diagram showing a fourth layer 34 of the second tape-wrapping protective portion 30 being wrapped. The adhesive tape T of the fourth layer 34 is adhered to another region of the adherend (adhesive tape T of third layer 33) on the inner side thereof while leaving a gap S in a region on the lower side of the sheet relative to the adherend (adhesive tape T of third layer 33) on the inner side thereof.

With the above, a gap S is formed between each layer of the adhesive tape T and the adherend on the inner side thereof. Thus, the positions of the gaps S vary between layers. Accordingly, a plurality of gaps S are dispersed along the circumferential direction of the wires 12. Note that, the size of the gap S in each layer is not particularly limited, and can be set as appropriate. For example, the gap S in each layer may be set such that the second tape-wrapping protective portion 30 is almost circular in shape.

Note that, here, an example is described where four gaps S are formed along the circumferential direction of the wires 12, but this is not a necessary configuration. Two gaps may be formed, 3 gaps may be formed, and 5 or more gaps may be formed along the circumferential direction of the wires 12.

Also, this example describes an example where the gaps S are formed in order along the circumferential direction of the wires 12, but this is not a necessary configuration. Four or more gaps S may be formed in an order different from the order of the gaps S following the circumferential direction of the wires 12. For example, similar to the example shown in FIG. 4, when four gaps S are to be formed along the circumferential direction of the wires 12, the two gaps S on the left and right sides of the sheet may be formed first, and then the two gaps S on the upper and lower sides of the sheet may be formed.

Note that the adhesive tape T may or may not have rigidity sufficient to maintain the state shown in FIG. 4. If the adhesive tape T is not sufficiently rigid to maintain the state shown in FIG. 4, it is also conceivable that the gaps S in this example will collapse, as shown in the example in FIG. 3. That is, in the example shown in FIG. 4, it is also conceivable that a portion of the adhesive tape T forming each gap S will adhere to the adherend on the inner side thereof, and the gaps S will collapse and divide into smaller gaps S.

Effects Etc. Of Embodiment 2

With the present example as well, similar to Embodiment 1, the outer diameter of the second tape-wrapping protective portion 30 increases by an amount corresponding to the gaps S between the adhesive tape T and the wires 12, and an edge is unlikely to reach the wires 12. The second tape-wrapping protective portion 30 can be formed using the adhesive tape T. Thus, a protective portion with high protective capabilities is provided while tending to avoid an operation to switch out binding adhesive tape T much as possible.

With the present example, a gap S is formed in each layer of the second tape-wrapping protective portion 30, and thus the gaps S can be formed over the largest area possible along the circumferential direction of the wires 12.

The second tape-wrapping protective portion 30 may be formed using fixed-position wrapping. In this case, a plurality of gaps S can be easily formed at a predetermined position. Also, the second tape-wrapping protective portion 30 may be formed using overlap wrapping. In this case, it is preferable that the number of gaps S and the number of layers of the overlap wrapping portion match. Specifically, in the case where four gaps S are formed in the circumferential direction of the wires 12, as shown in FIG. 4, it is preferable that the overlap wrapping portion 24 has four layers with a lap margin of ¾. Accordingly, four gaps S can be formed at one position along the longitudinal direction of the wires 12.

Note that the configurations described in the above embodiments and variations can be appropriately combined as long as no mutual contradiction occurs.

For example, the first tape-wrapping protective portion 20 and the second tape-wrapping protective portion 30 may be provided in one wire harness.

LIST OF REFERENCE NUMERALS 10, 110 Wire harness
12 Wire
20 First tape-wrapping protective portion (tape-wrapping protective portion)
22 End portion wrapping portion
24 Overlap wrapping portion
30 Second tape-wrapping protective portion (tape-wrapping protective portion)
31 First layer
32 Second layer
33 Third layer
34 Fourth layer
S Gap
T Adhesive tape

What is claimed is:

1. A wire harness comprising:
a wire; and
a tape-wrapping protective portion provided in at least a partial region along a longitudinal direction of the wire,
wherein the tape-wrapping protective portion includes a portion in which an adhesive tape is wrapped in a spiral shape around the wire such that respective turns of the adhesive tape partially overlap with each other in a width direction of the adhesive tape, thereby forming a gap in the surrounding region of the wire.

2. The wire harness according to claim 1,
wherein the tape-wrapping protective portion includes a first tape-wrapping protective portion,
the first tape-wrapping protective portion includes an end portion wrapping portion and an overlap wrapping portion,
adhesive tape is wrapped at the same position to form a plurality of layers in the end portion wrapping portion,
a partial region along the width direction of adhesive tape is wrapped in the spiral shape so as to be sequentially overlapped in the overlap wrapping portion,
a wrap-start portion of the overlap wrapping portion overlaps the outer circumferential side of the end portion wrapping portion, and
an intermediate portion of the overlap wrapping portion is provided with the gap.

3. The wire harness according to claim 2,
wherein, on an end-wrap portion side of the overlap wrapping portion, the adhesive tape is adhered to the wire at intervals in a circumferential direction of the wire.

4. A wire harness comprising:
a wire; and
a tape-wrapping protective portion provided in at least a partial region along a longitudinal direction of the wire,
wherein the tape-wrapping protective portion includes a portion wrapped with an adhesive tape to form a gap in the surrounding region of the wire,
wherein the tape-wrapping protective portion includes a second tape-wrapping protective portion in which the adhesive tape is wrapped to form a plurality of layers, and
each layer of the second tape-wrapping protective portion is wrapped so as to form a gap in regions different from each other in a circumferential direction.

5. The wire harness according to claim 1, wherein the gap is formed between an outer surface of the wire and an inner surface of the tape-wrapping protective portion.

6. The wire harness according to claim 1, wherein a ratio of an overlapping width of a turn of the adhesive tape to a full width of a directly previous turn of the adhesive tape is ½.

* * * * *